L. BERRY.
ANIMAL POKE.
APPLICATION FILED AUG. 13, 1917.
1,322,998.
Patented Nov. 25, 1919.
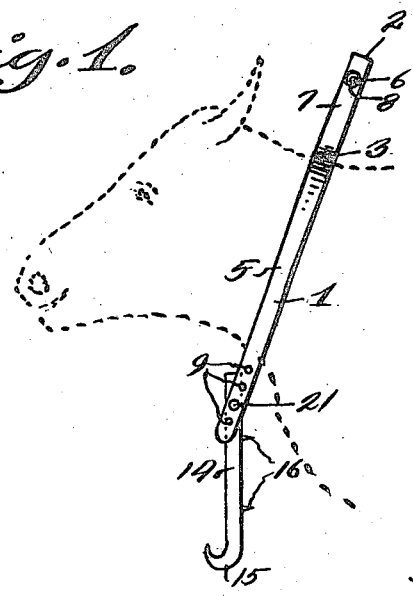
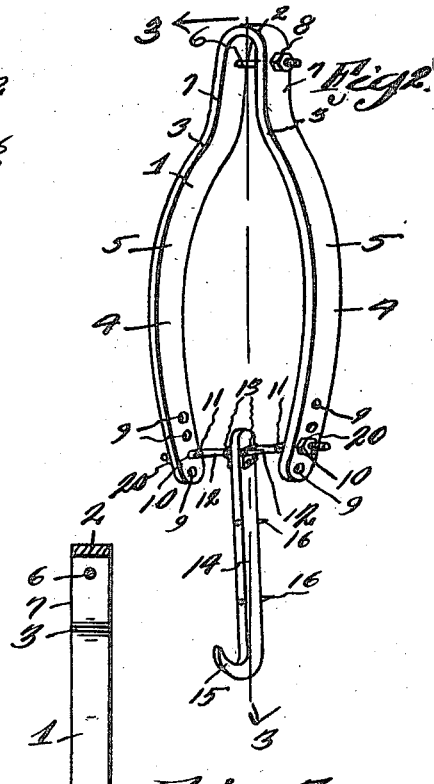
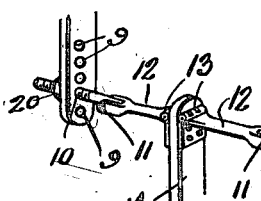
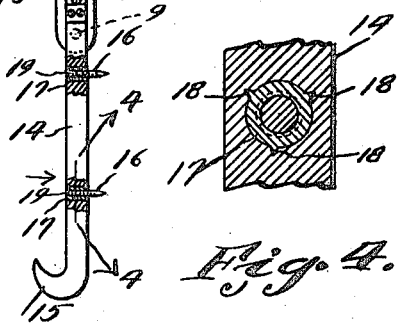
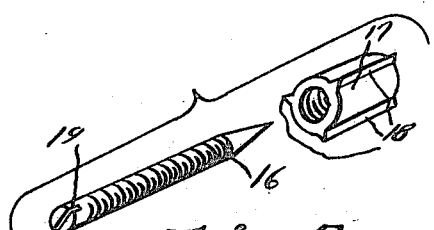
Witnesses
Inventor
Lennah Berry
By
Attorneys

UNITED STATES PATENT OFFICE.

LENNAH BERRY, OF FAIRVIEW, MONTANA.

ANIMAL-POKE.

1,322,998.      Specification of Letters Patent.      Patented Nov. 25, 1919.

Application filed August 13, 1917. Serial No. 186,044.

*To all whom it may concern:*

Be it known that I, LENNAH BERRY, a citizen of the United States, residing at Fairview, in the county of Richland, State of Montana, have invented a new and useful Animal-Poke; and I do hereby declare the following to be a full, clear, and exact description of the invention, such as will enable others skilled in the art to which it appertains to make and use the same.

This invention relates to an improved animal poke or yoke, and an object of the invention is to provide a cheapened structure, which will assure the pricking or prodding of an animal when attempting to pass through a wire fence.

A further object of the invention is to provide a poke having its sides yieldable and provided with a member, so connected to the sides of the poke, that when said member catches on the wire of the fence as the animal attempts to pass through the fence, the sides of the poke will be drawn together, and consequently bear sufficiently on the neck of the animal as to cause him to desist in attempting to pass through the fence.

A further object of the invention is to provide means whereby the pricking or prodding devices may be held securely to the downwardly suspended member of the poke, and whereby said pricking or prodding members may be removed and renewed.

In practical fields the details of construction may necessitate alterations falling within the scope of what is claimed.

The invention comprises further features and combination of parts as hereinafter set forth shown in the drawings and claimed.

In the drawings:—

Figure 1 is a view in side elevation of the improved poke or yoke as applied to an animal.

Fig. 2 is a detail perspective view of the poke detached from the animal.

Fig. 3 is a sectional view on line 3—3 of Fig. 2.

Fig. 4 is a sectional view on line 4—4 of Fig. 3.

Fig. 5 illustrates detail views of the pricking or prodding means and means for holding the prodding means.

Fig. 6 is an enlarged detail perspective view of the parts 10, 11, 12 and 13 and also the member 14, and a part of one of the sides 4 of the yoke.

Referring more especially to the drawings 1 designates the poke or yoke as a whole, and which may be constructed of any suitable material, preferably hickory or dog-wood, and while the wood is in its green state, the strip may be bent to form the arch 2, and the sides of the yoke curved or shaped or bent as at 3 and 4, and when the wood dries out the strip forming the poke will hold its shape, according to the bends or curves formed. The side portions 5 of the poke will tend to spring outwardly, and to hold them in different positions against so springing, a bolt 6 is passed through the sides 7 of the neck of the poke, there being a nut 8 on the bolt to hold the parts of the poke in the positions desired and to fit different size necks. The lower portions of the sides or arms of the poke are provided with apertures 9 and passing through any two opposite apertures are the shanks of the headed members 10. The inner ends of the shanks of the headed members are pivoted at 11 to the links 12, which in turn have their adjacent end portions hingedly connected at 13 to the opposite faces of the fence engaging member 14. The lower end of this member terminates in a hook 15 adapted to engage a wire fence as the animal attempts to pass therethrough. The act of the hook engaging the wire fence, will tilt the member 14 not only causing the spurs 16 to prick or prod into the animal but also causing a pulling action on the member 14, and owing to the upper end portion of the member 14 being hingedly or flexibly connected to the sides or arms of the poke said arms will be brought together, thereby so squeezing the neck of the animal as to cause him to desist in passing through the fence. Furthermore, the pulling action on the member 14 will pull downwardly on the poke, acting to force the upper part of the neck of the animal between the parts 7 of the poke. The parts 7 will thus bear or press on the upper part of the neck, which pressure, together with the pressure of the sides 5 of the poke will additionally cause the animal to desist in its attempt to pass through the fence. The spurs or prongs 16 are threaded adjustably in holders 17, which are arranged in the member 14. Said holders are provided on their exteriors with a V-shaped rib 18, which prevent the holders (which are substantially embedded in the member 14) from turning when adjusting the spurs or prongs. The member 14 may be made of any suitable material, preferably wood, such as ash, dogwood, or hickory, and in such a case, the hook 15 at the lower end of the member 14 may be constructed in any suitable manner, in fact bent into shape, preferably by steaming. It is clearly obvious, that since the member 14 is preferably constructed of wood, the threads of the spurs 16 would pull or cut through the wood of the member 14 hence in time the spurs 16 would become loosened. To avoid this disadvantage the bushings or holders 17 are arranged in the member 14 and in which bushings the spurs 16 are threaded. One end of each spur is provided with a slot or groove 19, to receive a tool whereby the spur may be adjusted. The nut heads 20 of the headed members 10 are adjustable so as to adjust the arms or sides 5 of the poke.

The invention having been set forth what is claimed as new and useful is:—

In an animal poke, a yoke adapted to engage the neck of the animal and having a narrow neck portion at its upper end adapted to arch down over the upper part of the neck of the animal, said yoke having spring sides, the lower extremities of said sides having apertures, members engaging said apertures, nut heads adjustable on the outer ends of said members against the outer face of the sides, links pivoted to the inner ends of said members, a fence engaging element between and hingedly connected to the inner adjacent ends of said links and provided with a hook at its unattached end, whereby as the fence engaging member is given a pulling action, the spring sides of the yoke are brought together.

In testimony whereof I have signed my name to this specification in the presence of two subscribing witnesses.

LENNAH BERRY.

Witnesses:
 JOHN A. BIRD,
 CLAYTON WORST.